(12) United States Patent
Spangler (10) Patent No.: US 7,921,955 B2
(45) Date of Patent: Apr. 12, 2011

(54) STABILITY SYSTEM FOR A TRIKE

(76) Inventor: Michael Spangler, Shell Beach, CA (US)

( * ) Notice: Subject to any disclaimer, the term of this patent is extended or adjusted under 35 U.S.C. 154(b) by 278 days.

(21) Appl. No.: 12/002,566

(22) Filed: Dec. 19, 2007

(65) Prior Publication Data

US 2009/0160141 A1 Jun. 25, 2009

(51) Int. Cl.
*B62D 61/06* (2006.01)
(52) U.S. Cl. ........................................... 180/210
(58) Field of Classification Search ............ 180/210, 180/211, 215, 282; 280/124.103
See application file for complete search history.

(56) References Cited

U.S. PATENT DOCUMENTS

| | | | | |
|---|---|---|---|---|
| 3,964,563 A * | 6/1976 | Allen | ............ | 180/217 |
| 4,046,211 A * | 9/1977 | Allen | ............ | 180/41 |
| 4,063,608 A * | 12/1977 | Sullivan | ............ | 180/215 |
| 4,632,413 A * | 12/1986 | Fujita et al. | ............ | 280/124.103 |
| 4,887,829 A * | 12/1989 | Prince | ............ | 280/282 |
| 6,006,849 A * | 12/1999 | Watkins | ............ | 180/209 |
| 6,871,718 B2 | 3/2005 | McGuire | | |
| 7,708,291 B1 * | 5/2010 | Henderson | ............ | 280/124.103 |
| 2003/0102176 A1 * | 6/2003 | Bautista | ............ | 180/210 |
| 2005/0012291 A1 * | 1/2005 | Bagnoli | ............ | 280/124.103 |
| 2006/0022422 A1 | 2/2006 | Tasma | | |
| 2006/0054370 A1 * | 3/2006 | Sugioka et al. | ............ | 180/211 |
| 2006/0226628 A1 * | 10/2006 | Lindsay et al. | ............ | 280/250 |
| 2006/0255550 A1 | 11/2006 | Pfeill | | |
| 2007/0075517 A1 | 4/2007 | Suhre | | |
| 2007/0126199 A1 * | 6/2007 | Peng et al. | ............ | 280/124.103 |
| 2009/0194965 A1 * | 8/2009 | Boston | ............ | 280/124.136 |

* cited by examiner

*Primary Examiner* — Faye M. Fleming

(57) ABSTRACT

A stability system for a trike includes an articulating rear wheel assembly and a steering assembly. The articulating rear wheel assembly includes a swing arm and an articulating rear spindle.

The articulating rear wheel assembly is connected with the steering assembly such that the wheel assembly rotates in a positive angle or in a negative angle in synchronous relationship with the front wheels of the trike.

The steering assembly comprises a plurality of steering components. In some preferred embodiments the steering components may be bell cranks, tie rods, or push/pull rods.

7 Claims, 9 Drawing Sheets

STABILITY SYSTEM FOR A TRIKE

FIELD OF THE INVENTION

The present invention relates to a stability system for a trike.

BACKGROUND OF THE INVENTION

One of the inherent problems with trikes is the fact that it lacks the stability of many typical four wheel vehicles. As a result from being less stable, trikes are more likely to tip over when confronted with sharp turns.

Ideally, the rear wheel of a trike should act, articulate, or camber in a similar fashion as a rear wheel of a motorcycle. With motorcycles, the rear wheel tilt in the same direction in which the lead wheel is turning. Moreover, the rear wheel of the motorcycle tilts in the opposite direction of the force which is acting upon the frame of the motorcycle.

For instance, as a motorcycle makes a right hand turn, the force acting upon the frame of the motorcycle biases the frame of the motorcycle to the left. For this reason, the person operating the motorcycle must lean to the right to counterbalance the leftward-biasing force acting upon the frame of the motorcycle.

As with motorcycles, when a trike is forced to make a right hand turn a similar force acts upon the frame of the trike in a leftward direction. However, unlike a motorcycle, the operator cannot lean a typical trike to counterbalance the force. As a result, the leftward force also biases the rear wheel of the trike in a horizontal direction. As this force acts upon the rear wheel, the resulting traction between the wheel and the surface is compromised. This weakened traction can create a less stable and more inherently dangerous vehicle.

Therefore, what is clearly needed in the art is an improved stability system for trikes. The stability system should co-opt various features seen in motorcycles to bring about a more stable system for trikes. Moreover, the stability system should also include a novel geometry to enhance the steering mechanism of the trike.

SUMMARY OF THE INVENTION

The present invention in some preferred embodiments consists of a unique stability system specifically adapted for trikes. The present invention provides for a safer and more stable trike. Whereas most trikes are inherently unstable compared with 4-wheeled vehicles, the present invention creates a more stable trike stability system by counterbalancing and/or controlling the rear tire in order to offset various inertial forces acting upon the frame of the trike.

It is an object of the present invention to provide for an articulating rear wheel for a trike. The rear wheel of the trike leans or articulates in the same direction in which the front tires are turning. By articulating the rear wheel of a trike in the same direction in which the front tires are turning, the rear wheel counterbalances and/or controls the inertial force acting upon the frame which pushes the frame in the opposite direction as the trike is turning.

It is a further object of the present invention to provide for an articulating rear wheel which augments the steering of a trike. By articulating the rear wheel horizontally the rear wheel also turns in the opposite direction of the front wheels. As a result, the turning radius of the trike is decreased thereby enabling precision steering.

DESCRIPTION OF PREFERRED EMBODIMENTS

According to a preferred embodiment of the present invention, a unique apparatus is used to provide for a more stable and safe stability system for a trike. In operation, the stability system acts by tilting (or cambering) the rear wheel of a trike. The system also augments the steering of the trike through its unique geometry. The system and apparatus are described in enabling detail below.

For the purposes of the present invention the term "camber" shall refer to the rotating, leaning, or otherwise articulating movement of the wheel assembly, rear wheel, or swing arm. The terms "camber", "tilt", and "articulate" shall hereafter be used and construed synonymously.

For the purposes of the present invention the term "trike" shall refer to any three-wheeled vehicle. In some preferred embodiments a trike may be a vehicle with two front wheels and one rear wheel. The term shall include both human-propelled trikes as well as mechanically propelled trikes. Moreover, it should also be noted that notwithstanding the figures herein, the trikes covered within the scope of the present invention are not limited to trikes with handle bars. Other preferred embodiments may be accompanied with trikes which are steered with steering wheels or similar systems or apparatus.

Figure 1A:
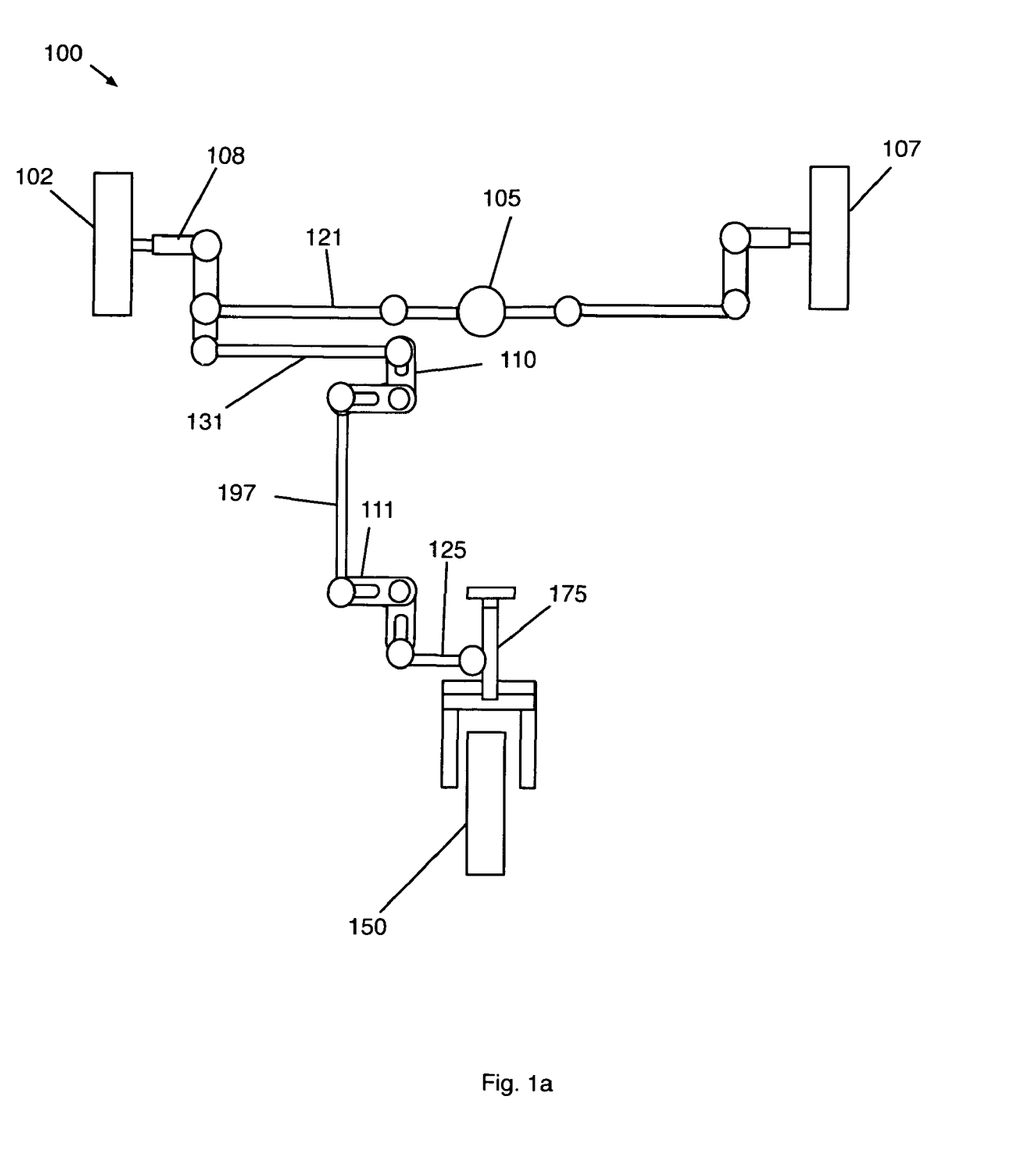
FIG. 1a is a plan view of a preferred embodiment of the present invention.
Figure 1B:
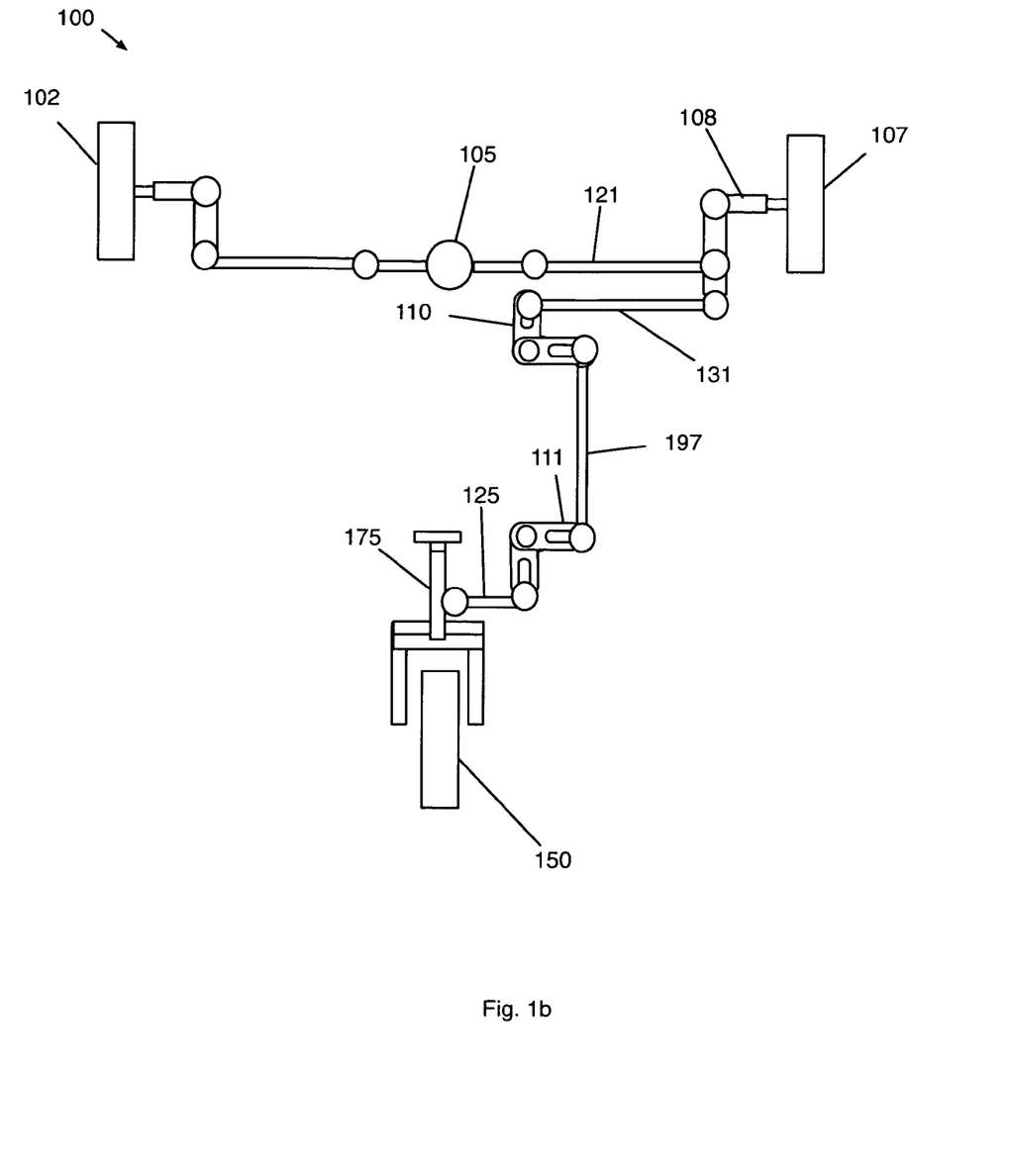
FIG. 1b is a plan view of a preferred embodiment of the present invention.
Figure 2:
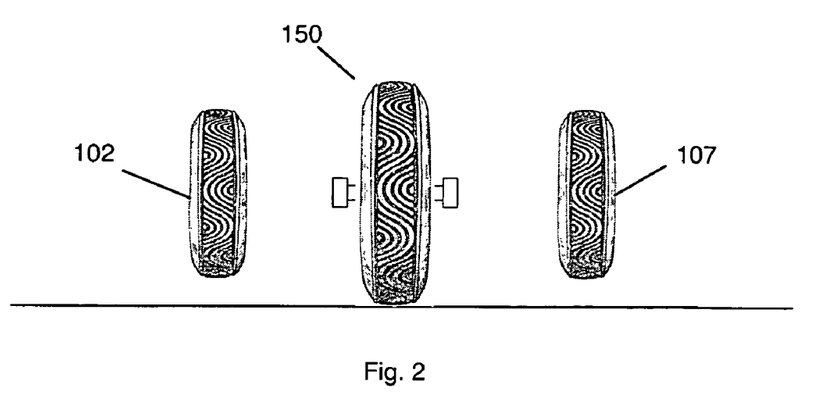
FIG. 2 is a rear view of a preferred embodiment of the present invention focusing upon the rear wheel of a trike.

FIGS. 1a and 1b illustrate a preferred embodiment of the present invention. FIG. 1a illustrates a preferred embodiment of the present invention where the steering assembly 100 is incorporated on the left side of the trike. FIG. 1b illustrates a preferred embodiment wherein the steering assembly 100 is disposed on the right side of the trike. It is of no consequence which side of the trike the system is disposed. The contrasting figures are used herein are for illustrative purposes only. For the purpose of clarity, the wheels of the trike shall hereafter be called out as first wheel 102, second wheel 107, and the rear wheel 150.

The stability system for a trike includes an articulating rear wheel assembly 195 and a steering assembly 100. The articulating rear wheel assembly and the steering assembly are in communication such that the rear wheel assembly rotates in a positive angle or in a negative angle in synchronous relationship with the front wheels of the trike.

Figure 7:
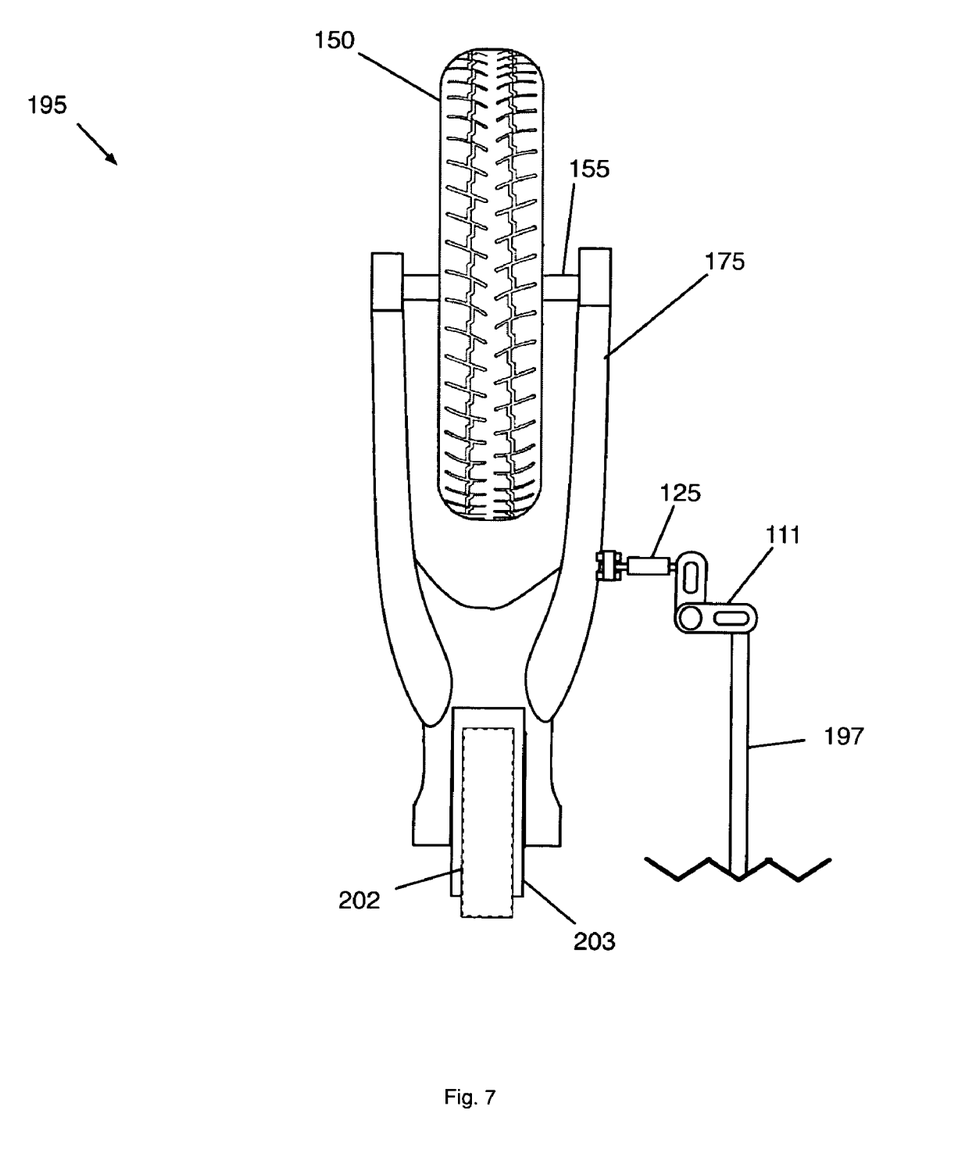
FIG. 7 is a plan view of a preferred embodiment of the present invention.

FIG. 7 illustrates a preferred embodiment where the articulating rear wheel assembly 195 comprises a swing arm 175, an articulating spindle 202, an articulating rear hub 203, and a rear wheel 150. The articulating rear wheel assembly is articulably connected with the steering assembly such that the wheel assembly rotates in a positive angle (illustrated in FIG. 3) and a negative angle (illustrated in FIG. 4) in synchronous relationship with the front wheels of the trike.

FIG. 7 illustrates that the rear wheel is affixed to the swing arm through the axle 155. The swing arm is in communication with the steering assembly through the fifth steering component 125. The rear wheel assembly 195 is cambered as the swing arm is pushed by the fifth steering component.

Figure 11:
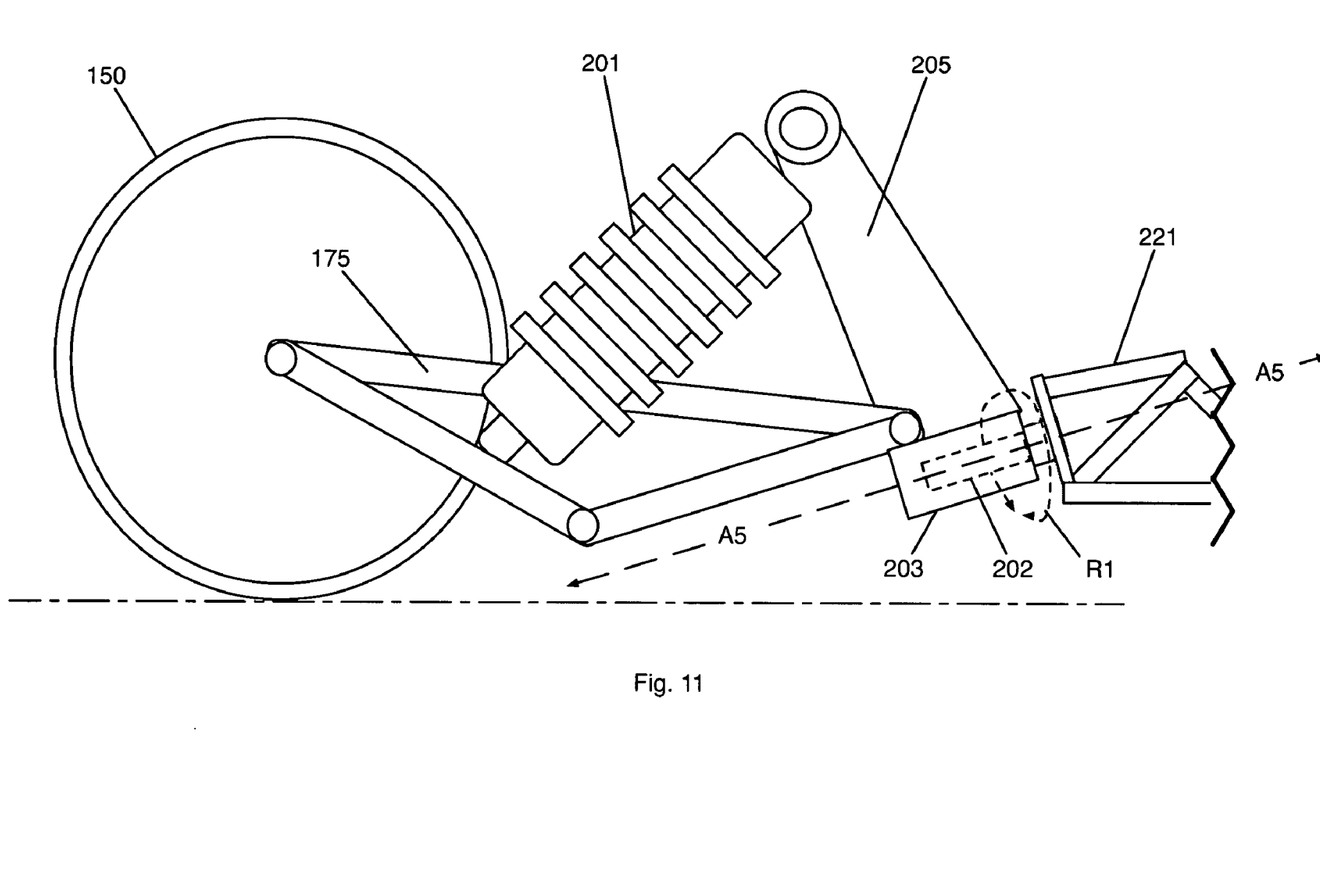
FIG. 11 is a side view of a preferred embodiment of the present invention.

FIG. 11 illustrates a side view of the articulating rear wheel assembly. In particular, Rotation R1 illustrates the path of rotation of the articulating rear wheel assembly around Axis A5. The articulating rear wheel assembly rotates around the articulating rear spindle, which, in turn, cambers or tilts the rear wheel 150 through the swing arm 175. The articulating rear spindle is disposed between the swing arm 175 and the frame 221 of the trike. In some preferred embodiments the articulating rear wheel assembly further comprises a shock apparatus 201 and a shock mount 205.

Turning back now to FIG. 1a, the steering assembly 100 is illustrated in some preferred embodiments. FIG. 1a illustrates that the front wheel spindle assembly 108 is in communication with the steering rack tie rod 121, which in turn is in communication with the steering rack 105. The front wheel spindle assembly is also in communication with the first steering component 131. The first steering component 131 is in communication with the second steering component 110. FIGS. 1a and 1b illustrate that the first steering component is an alpha tie rod. In FIG. 1a and FIG. 1b illustrate that in some preferred embodiments the second steering component is a bell crank 110. The second steering component is in communication with the fourth steering component 111 through the third steering component 197. FIGS. 1a and 1b illustrate that the third steering component is a push/pull rod 197 in some preferred embodiments. FIGS. 1a and 1b also illustrate that the fourth steering component 111 is a bell crank in some preferred embodiments. The fourth steering component is in communication with the swing arm 175 (which is part of the articulating rear wheel assembly 195) through the fifth steering component 125. FIGS. 1a and 1b illustrate that the fifth steering component is a tie rod in some preferred embodiments.

It should be noted here that the various steering components described herein may interchangeably use either tie rods, bell cranks, and similar devices or apparatus. For instance, steering components may be either hydraulic steering devices in some preferred embodiments. In other preferred embodiments the steering components may be electric actuators. In other preferred embodiments, pneumatic devices may be used as steering components. Moreover, in some preferred embodiments the steering components may comprise an assortment of bell cranks, tie rods, hydraulic actuators, pneumatic actuators, electric actuators and other actuators known in the art. For this reason, the scope of the present invention should not be construed to be limiting to only tie rods or bell cranks. Also, the number of steering components may increase or decrease as is necessary for various preferred embodiments.

Figure 3:
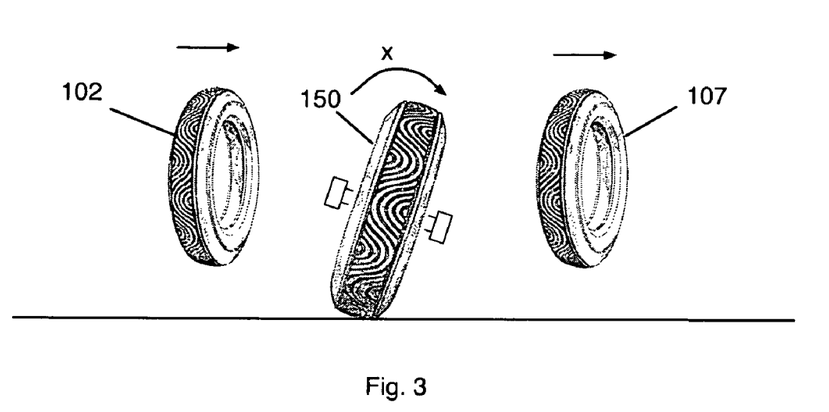
FIG. 3 is a rear view of a preferred embodiment of the present invention focusing upon the rear wheel of a trike.
Figure 4:
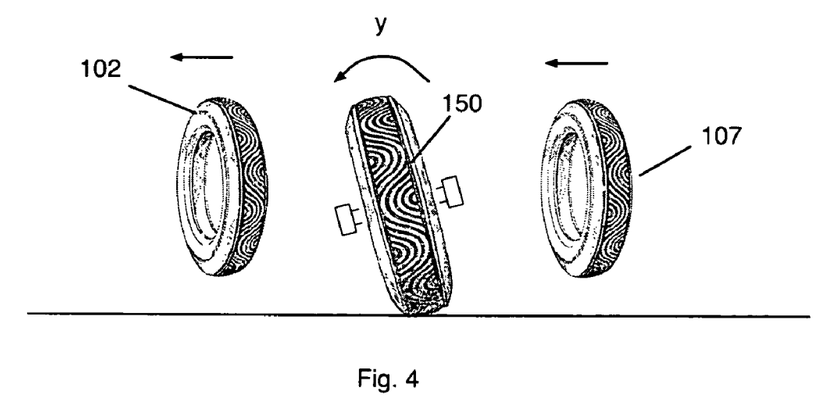
FIG. 4 is a rear view of a preferred embodiment of the present invention focusing upon the rear wheel of a trike.
Figure 5:
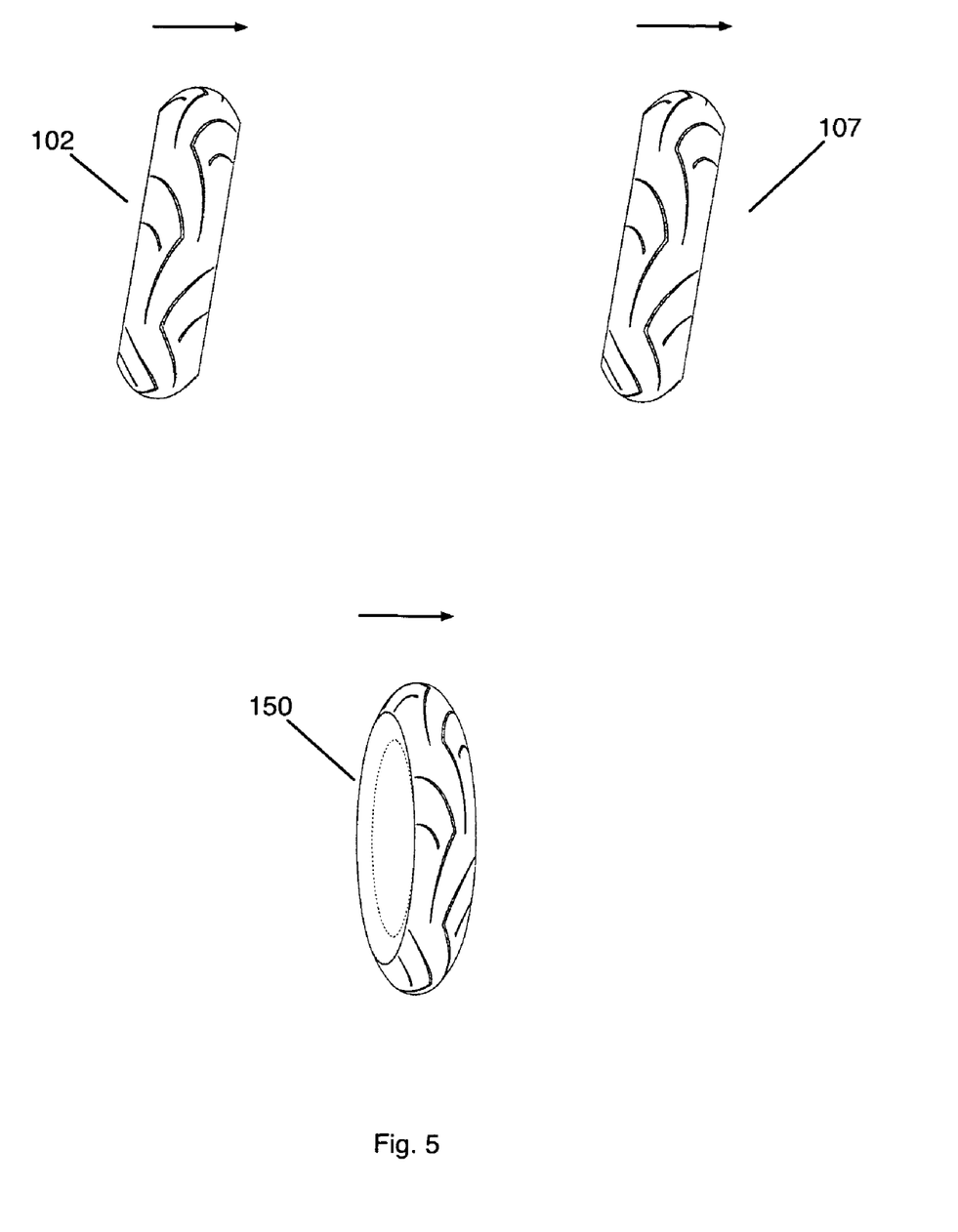
FIG. 5 is a plan view of a preferred embodiment of the present invention.
Figure 6:
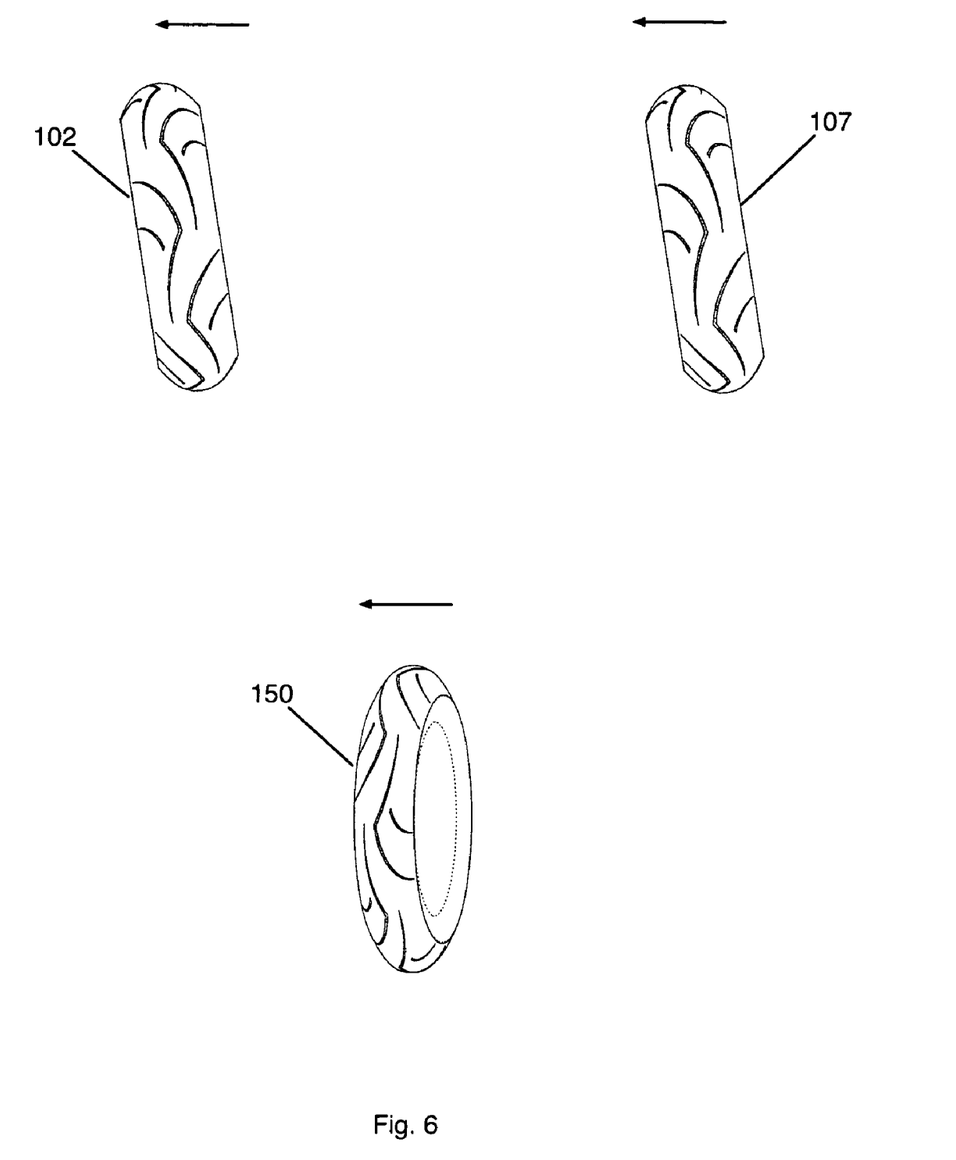
FIG. 6 is a plan view of a preferred embodiment of the present invention.

FIG. 2-6 illustrate how the principal mechanism by which the invention operates. The swing arm is articulable about an axis. As the swing arm articulates about its axis the rear wheel articulates in the same direction. FIG. 3 illustrates an instance where the front wheels are turning right. As the front wheels of the trike turn right, the rear wheel assembly correspondingly cambers in a positive angle X. Likewise, FIG. 4 illustrates an instance where the front wheels of the trike are turning left. Correspondingly, the rear wheel assembly cambers in a negative angle Y. These tilting angles counterbalance the force F (illustrated in FIGS. 9-10) exerted upon the frame of the trike to create more stability for the trike.

Figure 8:
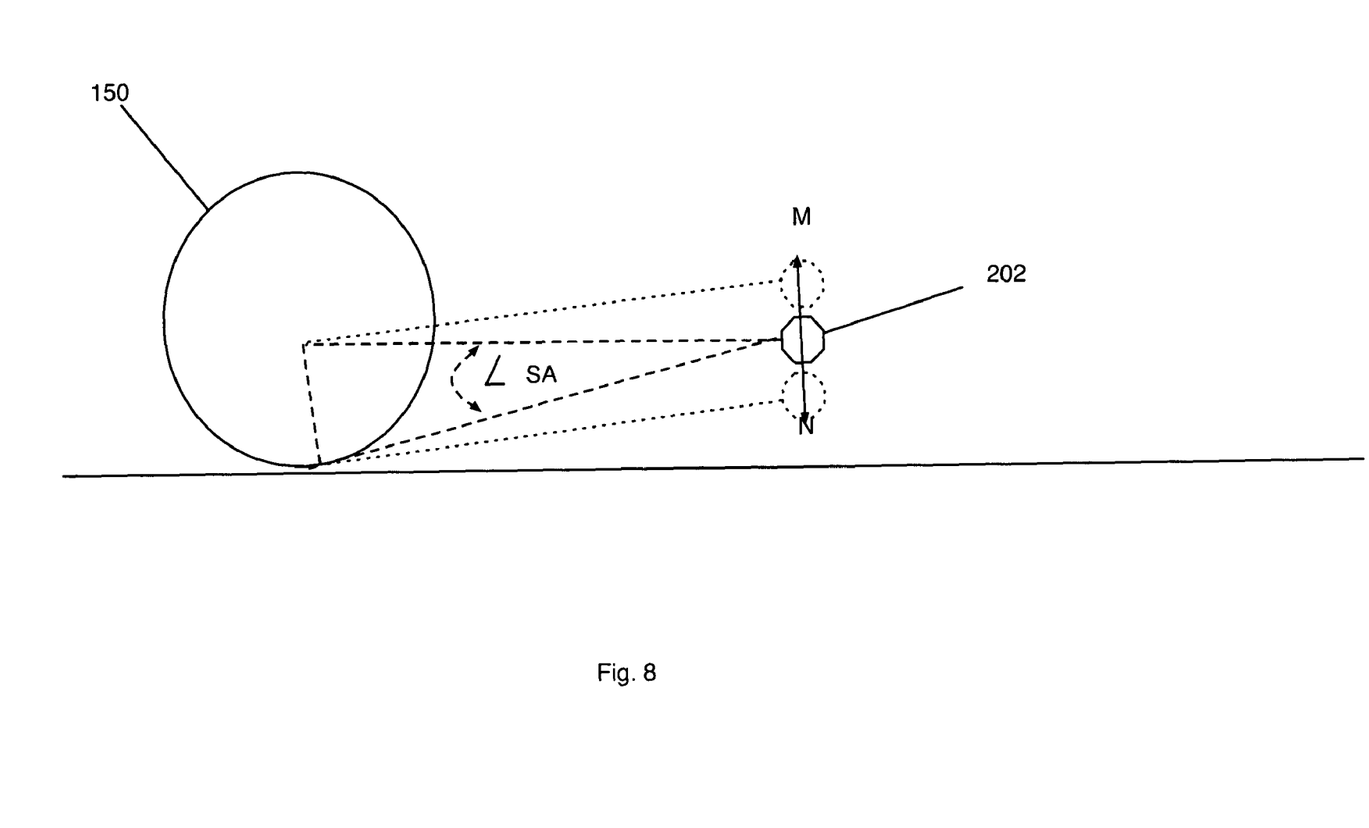
FIG. 8 is a side view of a preferred embodiment of the present invention.

FIG. 8 illustrates that the vertical points at which the articulating rear spindle 202 connects with the frame of the trike can vary between position points M and N. This angle SA at which the swing arm articulates affects the steering of the trike. As the position point at which the articulating rear spindle elevates, the greater the amount of turning or steering will result with the trike. Accordingly, a lower position point will result is weaker steering.

Figure 9:
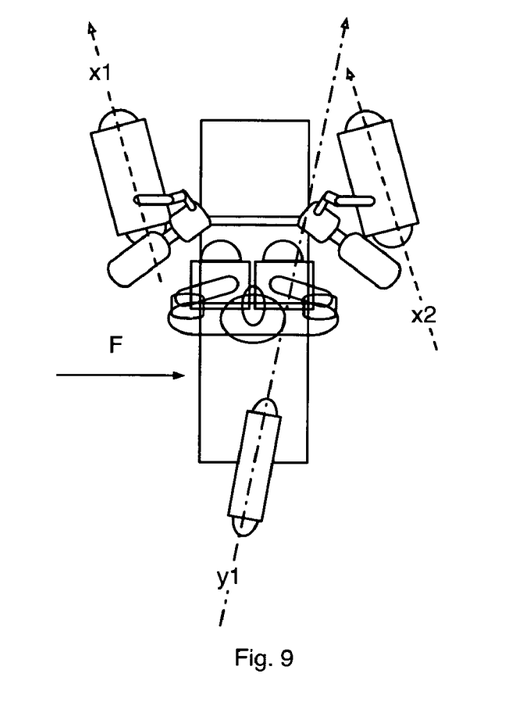
FIG. 9 is a plan view of a preferred embodiment of the present invention.
Figure 10:
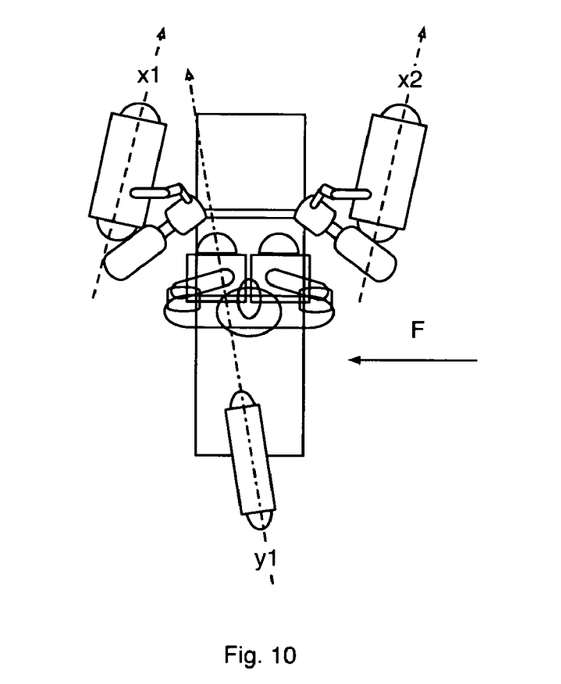
FIG. 10 is a plan view of a preferred embodiment of the present invention.

FIGS. 9-10 illustrate how the present invention augments the steering of a trike. As the rear wheel is tilted, the vector y1 of the rear wheel turns in the opposite direction as the vectors of the front wheels x1 and x2. The rear wheel turns in the opposite direction of the front wheels thereby reducing the turning radius of the trike and augmenting the steering power of the trike. This mechanism occurs naturally due to the geometry of cambering the rear wheel from side to side.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A stability system having a steering assembly comprising a first steering component, a second steering component, a third steering component, a fourth steering component, and a fifth steering component; the first steering component is in communication with the third steering component through the second steering component; the fifth steering component is in communication with the third steering component through the fourth steering component; the steering assembly is in communication with an articulating rear wheel assembly through the fifth steering component; the first steering component is a tie rod; the second steering component is a bell crank; the third steering component is a push/pull rod; the fourth steering component is a bell crank; the fifth steering component is a tie rod.

2. A stability system for a trike having a pair of front wheels, one rear wheel, and a frame comprising:
    an articulating rear wheel assembly and a steering assembly; the articulating rear wheel assembly comprises a swing arm and an articulating rear spindle;
    the articulating rear wheel assembly is connected with the steering assembly along a plurality of position points such that the wheel assembly rotates in a positive angle or in a negative angle in relationship with the front wheels of the trike; the steering assembly comprises a plurality of steering components; the steering assembly comprises a first steering component, a second steering component, a third steering component, a fourth steering component, and a fifth steering component; the first steering component is in communication with the third steering component through the second steering component;

the fifth steering component is in communication with the third steering component through the fourth steering component;
the steering assembly is in communication with the articulating rear wheel assembly through the fifth steering component.

3. The stability system of claim 2 wherein the first steering unit is a tie rod.

4. The stability system of claim 2 wherein the second steering unit is a bell crank.

5. The stability system of claim 2 wherein the third steering unit is a push/pull rod.

6. The stability system of claim 2 wherein the fourth steering unit is a bell crank.

7. The stability system of claim 2 wherein the fifth steering unit is a tie rod.

* * * * *